(12) United States Patent
Baumgartner et al.

(10) Patent No.: US 7,610,998 B2
(45) Date of Patent: Nov. 3, 2009

(54) DISC BRAKE

(75) Inventors: Johann Baumgartner, Moosburg (DE); Guenther Gschossmann, Ampfing (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/409,038

(22) Filed: Apr. 24, 2006

(65) Prior Publication Data

US 2007/0001511 A1 Jan. 4, 2007

Related U.S. Application Data

(63) Continuation of application No. PCT/EP2004/011246, filed on Aug. 10, 2004.

(30) Foreign Application Priority Data

Oct. 23, 2003 (DE) ................................ 103 49 303

(51) Int. Cl.
*F16D 55/08* (2006.01)
*G01B 7/30* (2006.01)

(52) U.S. Cl. ............. 188/72.9; 188/1.11 E; 188/1.11 L; 188/218 XL; 324/207.25; 324/173; 324/174; 73/514.31; 73/514.39; 303/168

(58) Field of Classification Search ............. 188/1.11 E, 188/1.11 L, 72.9, 218 XL; 324/207.25, 173–174; 73/514.31, 514.39
See application file for complete search history.

(56) References Cited

U.S. PATENT DOCUMENTS

| | | | | |
|---|---|---|---|---|
| 3,626,226 A | * | 12/1971 | Pauwels et al. ............. | 310/168 |
| 3,870,911 A | * | 3/1975 | Toyama et al. .............. | 310/155 |
| 4,069,435 A | * | 1/1978 | Wannerskog et al. ....... | 310/168 |
| 5,131,763 A | * | 7/1992 | Caron ......................... | 384/448 |
| 5,293,124 A | * | 3/1994 | Caillaut et al. .............. | 324/173 |
| 5,663,640 A | * | 9/1997 | Sakamoto ................... | 324/173 |
| 5,719,497 A | * | 2/1998 | Veeser et al. ................ | 324/174 |
| 5,998,987 A | | 12/1999 | Ikeuchi et al. | |
| 6,040,665 A | * | 3/2000 | Shirai et al. ................. | 318/14 |
| 6,053,046 A | * | 4/2000 | Masaki et al. ............ | 73/514.39 |

(Continued)

FOREIGN PATENT DOCUMENTS

DE 4402959 A1 8/1995

(Continued)

OTHER PUBLICATIONS

International Search Report dated Feb. 15, 2005 (Three (3) pages).

*Primary Examiner*—Robert A Siconolfi
*Assistant Examiner*—Mahbubur Rashid
(74) *Attorney, Agent, or Firm*—Crowell & Moring LLP

(57) ABSTRACT

A disc brake, especially for utility vehicles, which includes a caliper enclosing a brake disc, a pneumatically or electromotively operated tensioning device for tensioning the brake, which is located in the caliper, a magnet wheel rotating with the brake disc, and a stationary sensor for detecting the angle of rotation and the speed of the magnet wheel. The sensor is mounted at a distance from the magnet wheel and at least one line is connected to transmit pulses between the sensor and the magnet wheel. As a result, the sensor can be mounted on the housing protected from the action of heat and other environmental influences and so as to be easily accessible.

13 Claims, 2 Drawing Sheets

U.S. PATENT DOCUMENTS

| | | |
|---|---|---|
| 6,668,983 B2 * | 12/2003 | Drennen et al. .......... 188/181 T |
| 2003/0050749 A1 * | 3/2003 | Cervantez et al. ............. 701/49 |
| 2003/0083797 A1 * | 5/2003 | Yokoyama et al. ............ 701/70 |
| 2003/0179967 A1 | 9/2003 | Meeker et al. |
| 2003/0231013 A1 * | 12/2003 | Faymon et al. .............. 324/166 |
| 2004/0170345 A1 * | 9/2004 | Takada ....................... 384/448 |

FOREIGN PATENT DOCUMENTS

| | | |
|---|---|---|
| DE | 10207011 A1 | 8/2003 |
| EP | 0666478 A1 | 8/1995 |

* cited by examiner

DISC BRAKE

This application is a continuation of PCT Application No. PCT/EP2004/011246 filed on Oct. 8, 2004, which claims priority to German Application No. 103 49 303.4 filed Oct. 23, 2003, the disclosures of which are incorporated by reference herein.

BACKGROUND AND SUMMARY OF THE INVENTION

The present invention relates to a disc brake, in particular for commercial vehicles.

There are closed-loop brake control systems for disc brakes, with which systems the wheel rotational angle and the wheel speed are measured by means of electrical signal pulses. Here, a so-called magnet wheel, which has magnetic properties which alternate at predefined angular intervals, is usually attached to a part of the vehicle wheel. A sensor, which is fixed relative to the axle, is arranged at the magnet wheel which rotates when the vehicle is moving. The arrangement is such that the alternation of the magnetic states of the magnet wheel induces electrical pulses in the sensor as it moves past the sensor, which electrical pulses can be evaluated and are transmitted to an evaluating electronic unit via a line connection.

Previously known closed-loop brake control systems have the disadvantage that the sensors are frequently liable to faults on account of the environmental conditions. Since the brake rotor of the wheel brake is inevitably also connected to the wheel hub, there is high thermal loading at the installation position of the sensor, which thermal loading can lead to melting of the plastic housing of the sensors and to charring of the cables which carry the signal. The sensitive inner components of the sensors are damaged as a result of this exposure to a high heat, and this can ultimately result in a functional failure. For increased safety, particularly heat-resistant materials must therefore be used in a complex way.

German patent document DE 44 02 959 presents a disc brake having a device for pulse generation at vehicle wheels, in which a magnet ring is arranged on a brake disc. A sensor, by which the wheel speed can be measured, is provided adjacent to the magnet ring. As a result of being arranged directly adjacent to the brake disc, the sensor is subjected to increased loading.

In addition, in German patent document DE 102 07 011 A1, a sensor for measuring rotational speed is provided on an axle of a motor vehicle, in which the sensor is fastened in an axially running opening in the stub axle. As a result, the sensor can be arranged in a largely protected manner, the assembly and production being comparatively complex.

There is therefore needed a disc brake, in particular for commercial vehicles, which makes reliable measurement of the rotational speed and of the rotational angle possible, and during which process the operation of the sensor should not be affected by environmental influences.

This need is not by a disc brake, in particular for commercial vehicles having a brake caliper which straddles a brake disc; a pneumatically or electromotively actuable brake application device, arranged in the brake caliper, for applying the brake; a magnet wheel, which rotates with the brake disc; and a positionally fixed sensor for measuring the rotational angle and the rotational speed of the magnet wheel, wherein the sensor is arranged at a distance from the magnet wheel, and at least one line for transmitting pulses is connected between the sensor and the magnet wheel.

According to an aspect of the invention, the sensor for measuring the rotational angle and the rotational speed of the magnet wheel is arranged at a distance from the magnet wheel, and at least one line for transmitting pulses is connected between the sensor and the magnet wheel. As a result, the installation position of the sensor, which is sensitive to environmental influences, may be arranged at a distance from the magnet wheel, so that the thermal loadings which occur at the magnet wheel as a result of the brakes being applied no longer occur at the sensor. The sensor can, in fact, also be arranged in a protected region, it being possible for the rotational speed and the rotational angle to be measured in a manner known per se, since at least one line for bridging the distance to the sensor is connected between the magnet wheel and the sensor.

According to a preferred embodiment, the line for transmitting pulses includes a soft iron rod. As a result, the pulses generated by magnets may be transmitted-on in a simple manner. The one or more soft iron rods are relatively insusceptible with regard to the temperature differences which occur. Alternatively, a corresponding optical light guide may be used for transmitting pulses or light signals in an optical measuring system.

For particularly good protection of the line and of the sensor for measuring the rotational angle and the rotational speed, a separating wall is preferably arranged between the line and the magnet wheel. This also avoids dirt adversely affecting the measurement by means of the line and the sensor. The separating wall is preferably formed by a non-magnetic metal separating plate, which does not impede the measurement of the signals and additionally constitutes a good thermal conductor, so that when thermal loading occurs, it can be quickly dissipated again over a large area.

For simple assembly of the measuring unit, the sensor is mounted on a printed circuit board, which may be accessed by removing a cover. As a result, the printed circuit board and the sensor can, if necessary, be easily exchanged in the event of a functional failure. For easy accessibility, the sensor may be mounted adjacent to the brake application device, on that side of the brake caliper which faces away from the brake disc.

For a simple construction of the measuring unit, the sensor is formed from a Hall sensor and a permanent magnet, which is then connected to a corresponding electronic circuit. The disc brake according to the invention is particularly suitable for exemplary embodiments in which an electronic circuit is provided for the open-loop and closed-loop control of the readjustment due to brake lining wear. This is because the many electrical components can be mounted on one common printed circuit board. Here, it is possible to use the present electronic circuit to evaluate the sensor signals, and to use a data bus (for example, a CAN bus) to make the information available to the electronic circuits connected downstream, if such a data bus is present.

Both active and passive sensors may be used for measurement, the active sensors being connected to an electrical voltage source. In the case of active sensors, the magnetic circuit can be split between two lines, which each separately connect the magnetic circuit between the magnet wheel and the sensor.

Other objects, advantages and novel features of the present invention will become apparent from the following detailed description of the invention when considered in conjunction with the accompanying drawings.

DETAILED DESCRIPTION OF THE DRAWINGS

Figure 1:
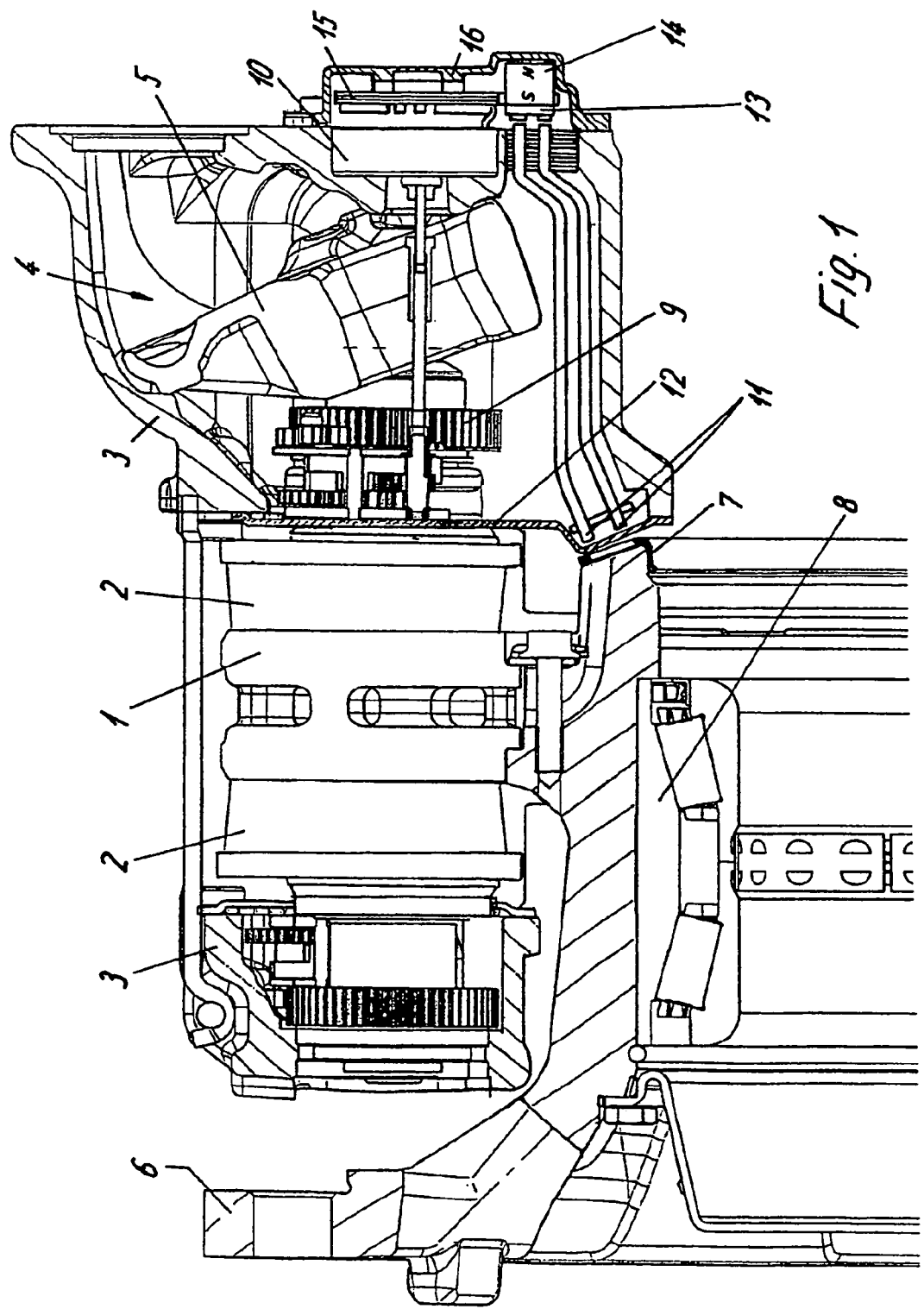
FIG. 1 is a sectional view through an exemplary embodiment of a disc brake according to the invention.

A disc brake uses a brake disc 1 (when installed), which is enclosed on both sides by brake linings 2. The brake linings 2 can be pressed against the brake disc 1 by way of a brake application device 4, which may be actuated in a manner known per se via a brake lever 5. The brake application device 4 is arranged in a brake caliper 3, which also includes a section straddling the brake disc 1. It is possible that the brake caliper 3 is mounted in a moveable or positionally fixed manner in order to transmit the required forces from the brake application device 4 to the brake disc 1 via the brake linings 2.

The brake disc (or rotor) 1 is mounted on a wheel hub 6, which can be connected to a wheel rim. The wheel hub 6 is mounted by way of a bearing 8 so as to be rotatable about an axle. A magnet wheel 7 is arranged on the wheel hub 6, which magnet wheel 7 has magnetic properties which alternate at predefined angular intervals. The magnet wheel 7 may, for example, be formed from a ring which is made from sheet steel and has holes in its face at certain angular intervals, so that magnetizable and non-magnetizable regions alternate. It is also possible to use a ring as the magnet wheel, in which permanently magnetic regions and non-magnetic or weak magnetic regions are provided in alternation. Finally, instead of magnetic pulses, optical pulses, for example by alternating light and dark regions, can also be used for the magnet wheel 7 in order to measure the rotational angle and the rotational speed.

A wear adjustment gearing 9 is arranged between the brake application device 4 and the brake disc 1 in the brake caliper 3, which wear adjustment gearing 9 can be actuated by way of an electric drive 10 so that wear of the brake linings 2 can be compensated for by readjusting the play between the brake disc and the linings. The wear adjustment device can be embodied in a manner corresponding to the German patent application 103 05 702.1, the disclosure of which is expressly incorporated as non-essential material by reference herein.

In order to measure the rotational speed or the rotational angle, two soft iron rods 11 are held in the brake caliper 3 in order to transmit signals. The soft iron rods 11 are spaced apart from the magnet wheel 7 by way of a separating wall 12 made from a metal plate. The separating wall 12 may be mounted on the brake caliper 3 and can seal off the interior space of the brake caliper 3 in order to prevent impurities from entering the interior space. As a result, the soft iron rods 11 are also arranged in a protected manner, but they can receive pulses from the magnet wheel 7 through the separating wall 12.

The soft iron rods 11 are guided by the brake caliper 3 away from the brake disc on to the side of the caliper which is away from the brake disc 1. There, the rods 11 are coupled to a Hall sensor 13, which is in turn connected to a permanent magnet 14. The sensor unit (which is thus formed from the Hall sensor 13 and the permanent magnet 14) is fixed to a printed circuit board 15, which is arranged in a protected manner by use of a cover 16. In the event of a functional failure, the cover 16 may be removed and the printed circuit board 15—and also the Hall sensor 13 and the permanent magnet 14—may be easily accessed. The electronic circuitry for the wear adjustment device can also be arranged on the printed circuit board 15. There is, therefore, no need to route special cabling to the brake caliper 3 for measuring the rotational angle and the rotational speed.

Figure 2:
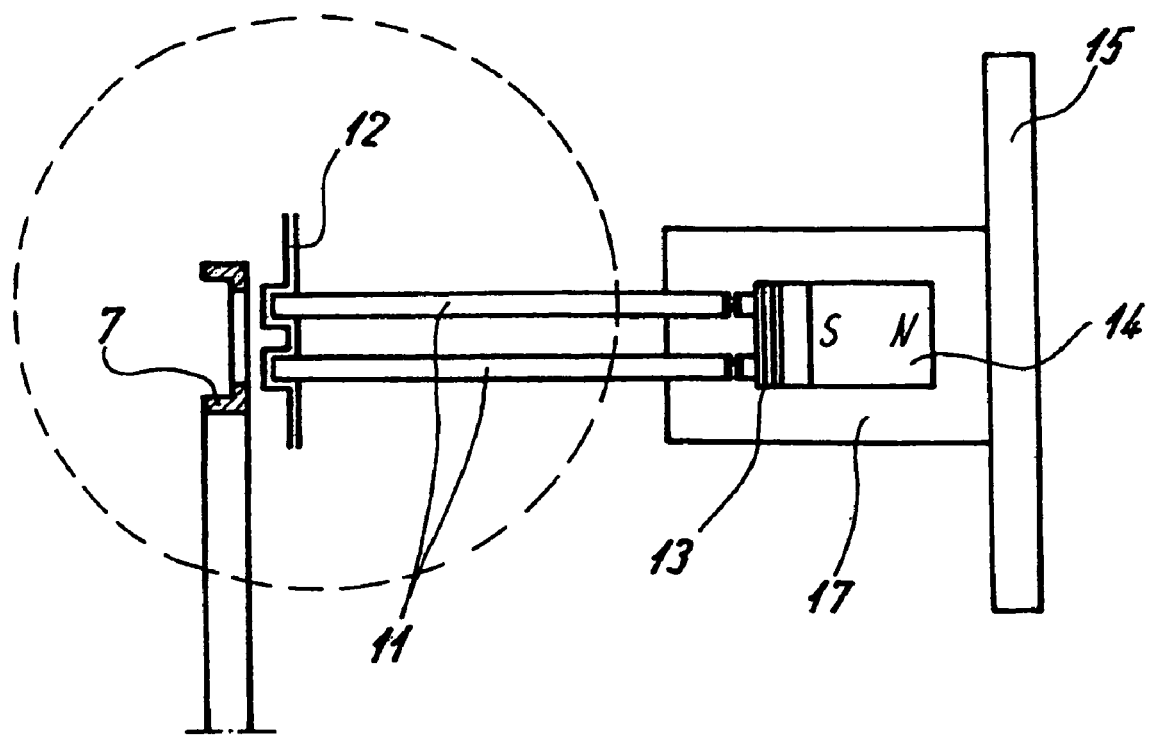
FIG. 2 is a schematic view of the measurement systems in FIG. 1.

The construction according to the invention for measuring the rotational speed and the rotational angle is schematically illustrated once again in FIG. 2. As the magnet wheel 7 rotates, the alternation of the magnetic states is measured in the soft iron rods 11, the soft iron rods 11 being arranged in a protected manner by way of the dividing wall 12. Electrical signals, which can be evaluated, are generated from the magnetic pulses by way of the soft iron rods 11, the Hall sensor 13 and the permanent magnet 14, which electrical signals are transmitted on to an open-loop controller (not illustrated) via the printed circuit board 15. The sensitive measuring unit including the Hall sensor 13 and the permanent magnet 14 is accommodated in a plastic housing 17, which is arranged at a distance from the magnet wheel 7. Thermal loading, which would otherwise be critical for the sensor unit, may occur at the magnet wheel 7 as a result of braking operations. By arranging the sensor unit on the side of the brake caliper 3 which faces away from the brake disc 1, it is ensured that such exposure to heat does not adversely affect the measurement of the rotational speed and rotational angle.

In the exemplary embodiment illustrated, an active sensor is illustrated which is connected to an electrical voltage source. It is also possible to use passive sensors which independently generate the energy for forming the signal by way of electromagnetic induction in a magnet coil. Other sensors, such as optical sensors, may also be used, in which case optical lines are then required instead of the soft iron rods 11, and a transparent material or corresponding cut-outs are required instead of the separating wall 12 made from sheet metal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A disc brake for use with a brake disc, comprising:
a brake caliper which, in use, straddles the brake disc;
a pneumatically or electromotively actuable brake application device, arranged in the brake caliper for applying the brake;
a magnet wheel, which in use rotates with the brake disc;
a positionally fixed sensor for measuring a rotational angle and a rotational speed of the magnet wheel
at least one line, separate from the sensor, operatively arranged in the caliper to transmit magnetic pulses;
wherein the sensor is arranged on a side of the caliper, which side faces away from the brake disc in use, at one end of the line, and is spaced apart from the magnet wheel, which magnet wheel is arranged at an opposite end of the line; and
wherein the sensor is a separate component from the one line and is exchangeable without changing the one line.

2. The disc brake as claimed in claim 1, wherein the line for transmitting pulses comprises a soft iron rod.

3. The disc brake as claimed in claim 1, further comprising a separating wall arranged between the line and the magnet wheel.

4. The disc brake as claimed in claim 2, further comprising a separating wall arranged between the line and the magnet wheel.

5. The disc brake as claimed in claim 3, wherein the separating wall is formed by a non-magnetic metal separating plate.

6. The disc brake as claimed in claim 1, wherein the sensor is mounted on a printed circuit board, which is accessible by removing a cover.

7. The disc brake as claimed in claim 2, wherein the sensor is mounted on a printed circuit board, which is accessible by removing a cover.

8. The disc brake as claimed in claim 3, wherein the sensor is mounted on a printed circuit board, which is accessible by removing a cover.

9. The disc brake as claimed in claim 1, wherein the sensor comprises a permanent magnet.

10. The disc brake as claimed in claim 2, wherein the sensor comprises a permanent magnet.

11. The disc brake as claimed in claim 1, wherein the sensor is an active sensor, two lines being operatively arranged in the caliper for transmitting pulses to the active sensor.

12. The disc brake as claimed in claim 1, further comprising an electronic circuit for open-loop and closed-loop control of wear adjustment due to brake lining wear.

13. The disc brake as claimed in claim 6, further comprising an electronic circuit for open-loop and closed-loop control of wear adjustment due to brake lining wear.

* * * * *